United States Patent [19]
Matzinger et al.

[11] Patent Number: 6,103,780
[45] Date of Patent: Aug. 15, 2000

[54] INK JET INKS

[75] Inventors: Michael D. Matzinger; Charles G. Ruffner, Jr., both of Mt. Pleasant, S.C.

[73] Assignee: Westvaco Corporation, New York, N.Y.

[21] Appl. No.: 09/061,557

[22] Filed: Apr. 16, 1998

[51] Int. Cl.⁷ .......................... C09D 11/02; C09D 11/10; C09D 133/08; C09D 125/04
[52] U.S. Cl. .................... 523/160; 106/31.65; 106/31.89
[58] Field of Search ...................... 523/160, 161; 106/31.13, 31.6, 31.65, 31.9, 31.85, 31.86, 31.89

[56] References Cited

U.S. PATENT DOCUMENTS 5,880,238  3/1999  Bafford .................................. 526/318

OTHER PUBLICATIONS

Alger, Mark; Polymer Science Dictionary, Chapman and Hall, London (p. 526), 1989.

*Primary Examiner*—Vasu Jagannathan
*Assistant Examiner*—Callie E. Shosho
*Attorney, Agent, or Firm*—Terry B. McDaniel; Daniel B. Reece, IV; Richard L. Schmalz

[57] ABSTRACT

A pigment-based, ink jet ink composition is disclosed which is characterized by water and accent marker resistance and by high optical density and acuity of the print. Such improvements are achieved (without loss of print quality, jetting properties, storage stability, reliability, and drying time) by adding to the ink a polymer comprised of the polymerizable half-ester of an aliphatic, nonionic surfactant, and a monomer, preferably chosen from the group of styrene, acrylic acid, and butyl acrylate.

29 Claims, No Drawings

INK JET INKS

BACKGROUND OF THE INVENTION

1. Field of the Invention

The present invention relates to aqueous, pigment-based ink compositions for use in ink jet printers. These compositions comprise an insoluble pigment, a polymer that contains a bound nonionic aliphatic surfactant, and a carrier medium. The ink compositions are characterized by water and accent marker resistance properties, while achieving excellent print quality, jetting properties, storage stability, reliability, and drying times.

2. Description of Related Art (Including Information Disclosed Under 37 CFR 1.97 and 37 CFR 1.98)

Prints made from commercial aqueous, pigment-based, ink jet inks exhibit poor resistance to water and accent markers and are lower in optical density than prints made from laser printers. Those skilled in the art seek to eliminate these deficiencies. A suitable ink jet ink additive has been sought which would allow the ink jet printer producers to achieve optical densities now achieved only by laser printer producers, while imparting excellent resistance to water and accent markers.

Ink jet printing involves placement, in response to a digital signal, of small drops of a fluid ink onto a surface to form an image without physical contact between the printing device and the surface. In drop-on-demand (DOD) ink jet printing systems, liquid ink droplets are propelled from a nozzle by heat (thermal or bubble ink jet) or by a pressure wave (piezo ink jet). Thermal or bubble ink jet inks typically are based on water and glycols. Piezo ink jet systems generally use aqueous, solvent, or solid inks. These last inks, also known as phase change inks, are solid at ambient temperature and are liquid at printing temperatures.

The following properties are required of an ink composition for ink jet printing:

(a) high quality printing (edge acuity and optical density) of text and graphics on substrates, in particular, on uncoated cellulosic paper;

(b) short dry time of the ink on a substrate such that the resulting printed image is not smudged when rubbed or offset onto a subsequent printed image placed upon the print;

(c) good jetting properties exhibited by a lack of deviation of ink droplets from the flight path (misplaced dots) and of ink starvation during conditions of high ink demand (missing dots);

(d) resistance of the ink after drying on a substrate to water and to accent markers;

(e) long-term storage stability (no crust formation or pigment settling); and (f) long-term reliability (no corrosion, nozzle clogging, or kogation).

Inks are known that possess one or more of the above listed properties. However, few inks are known that possess all of the above listed properties. Often, the inclusion of an ink component meant to satisfy one of the above requirements can prevent another requirement from being met. For example, the inclusion of a polymer in the ink composition can improve the water and accent marker resistance of the ink on a substrate after drying. However, the polymer can cause flocculation or settling of the pigments and impair jetting properties and long-term storage stability. Thus, most commercial ink jet inks represent a compromise in an attempt to achieve at least an adequate response in meeting all of the above listed requirements.

Attempts made to meet the desirable ink jet ink criteria listed above are disclosed in U.S. Pat. Nos. 5,565,022; 4,384,096; 4,138,381; 4,077,926; 3,894,980; 3,891,591; 3,657,175. The inks of these patent disclosures, however, do not teach accomplishment of resistance to water and accent markers and increased optical density while continuing to achieve other desirable ink jet ink properties.

Accordingly, an object of the present invention is to provide improved pigment-based ink compositions capable of satisfying simultaneously the properties required of an ink composition for ink jet printing, especially the aforementioned properties (a) to (f).

Another object of the instant invention is directed to preparation of a polymer that provides an ink composition for ink jet printing with reduced water and accent marker sensitivity.

Still another advantageous feature of the invention which is the subject matter of this application is to provide an ink that has excellent filterability such that the ink can be filtered during manufacturing without ruining the filters. Other objects and advantages of the present invention will become apparent from the following disclosure.

SUMMARY OF THE INVENTION

It as been discovered also that the objects of the invention can be met (i.e., the water and accent marker resistance of a pigment-based, ink jet ink can be improved without a reduction in the optical density and acuity of the print) by adding to the ink a polymer comprised of the polymerizable half-ester of an aliphatic, nonionic surfactant, and a monomer, preferably chosen from the group consisting of styrene, acrylic acid, and butyl acrylate.

DESCRIPTION OF THE PREFERRED EMBODIMENT(S)

In accordance with the present invention, the ink compositions comprise:

(a) from about 40% to about 98% of a water-based solvent system (carrier medium), (b) from about 1% to about 20% of one or more pigments, and (c) from about 0.1 to about 10% of one or more polymers, soluble or dispersible in water or in alkali, said polymer comprising (i) at least 0.1% by weight based on the total weight of the polymer of a monomer represented by the following formula:

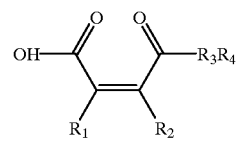

where:
$R_1$ is H, $CH_3$, or $C_6H_5$;
$R_2$ is H, $CH_3$, or $C_6H_5$;
$R_3$ is O, N, or S; and $R_4$ is of the formula:

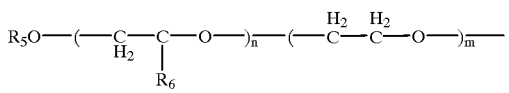

where
$R_5$ is $C_8$–$C_{20}$ alkyl;
each $R_6$ is $C_1$–$C_2$ alkyl; and
n is an average number from about 6–100 and m is an average number from about 0–50 provided that $n \geq m$ and $\Sigma(n+m)$ is about 6–100; or

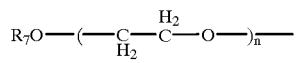

where
$R_7$ is $C_8$–$C_{20}$ alkyl; and
n is about 6–50; and (ii) at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydrides, and mixtures thereof.

Components other than those listed above may be included in the ink compositions to achieve specific printer, substrate, or end use requirements.

Carrier Medium

The ink compositions employed in the practice of the invention include a carrier medium comprised of water or a mixture of water and at least one water-soluble organic component. It is intended, however, that the teaching of this invention may be applicable to other carrier media as well. The carrier medium is present from about 40 to 98% by weight, preferably from about 70 to 95%, based on the total weight of the ink.

Suitable water-soluble organic components include: alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, ethyl lactate, and ethylene carbonate; ethers, such as tetrahydrofuran or dioxane; glycerine; glycols; glycol esters; glycol ethers; ketones, such as acetone, diacetone, or methyl ethyl ketone; lactams, such as N-isopropyl caprolactam or N-ethyl valerolactam; lactones, such as butyrolactone; organosulfides; sulfones, such as dimethylsulfone; organosulfoxides, such as dimethyl sulfoxide or tetramethylene sulfoxide; and derivatives thereof and mixtures thereof. Among these organic components, an alcohol (such as ethanol) and a glycol (such as diethylene glycol) are preferred.

The ink compositions typically contain at least one glycol that serves as a humectant to prevent drying of the compositions during the printing operation, as well as during storage of the compositions. Glycols suitably employed in the practice of the invention include ethylene glycol, diethylene glycol, triethylene glycol, tetraethylene glycol, propylene glycol, dipropylene glycol, glycerine, and polyethylene glycol. Polyethylene glycol is the preferred glycol.

The carrier media combinations used in the ink compositions must be compatible with the pigments so that flocculation or settling does not occur as a result of incompatibility. Also, the media combinations should be compatible with the materials of construction of the print head.

Pigment

No particular limitation is imposed on the type or the amount of pigment used. The term "pigment" refers to a water insoluble colorant. A large range of pigments, organic and inorganic, may be used either alone or in combination. Pigments used in ink jet inks typically are in the dispersed state and are kept from agglomerating and settling out of the carrier medium by placing acidic or basic functional groups on the surface of the pigments, attaching a polymer onto the surface of the pigments, or adding a surfactant to the ink. Any water-soluble and water-insoluble dye that is compatible with ink jet printing may be employed in the practice of the invention.

The amount of the pigment present in the ink compositions is from about 1 to 20 wt %, preferably from about 2 to 5 wt %. Among the pigments that may be used in the practice of the present invention for a yellow ink include C.I. Pigment Yellow 1, C.I. Pigment Yellow 3, and C.I. Pigment Yellow 13. Among the pigments that may be used in the present invention for a magenta ink include C.I. Pigment Red 5, C.I. Pigment Red 7, C.I. Pigment Red 12, C.I. Pigment Red 112, and C.I. Pigment Red 122. Among the pigments that may be used in the present invention for a cyan ink include C.I. Pigment Blue 1, C.I. Pigment Blue 2, C.I. Pigment Blue 16, C.I. Vat Blue 4, and C.I. Vat Blue 6.

Carbon black also may be used as a pigment. Examples of blacks which are available commercially include ACRYJET Black-357 (Polytribo), BONJET CW-1 (Orient Chemical Corporation), DISPERS Jet Black 1 (BASF), and NOVOFIL Black BB 03 (Hoechst Celanese Corporation).

The pigment particles need to be small enough in size so that they can pass cleanly through the printing device. Because the ejecting nozzles of ink jet ink printers range in diameter from about 10 to 100 microns, pigments suitable for use in the present invention may have a range of particle sizes from about 0.01 microns to 100 microns, preferably from about 0.01 microns to 10 microns, and more preferably from about 0.01 microns to 5 microns.

Polymers

The polymers of the present invention are prepared by polymerization in which the esterification product of a surfactant and a derivatizing agent is polymerized with one or more other monomers. Methods of polymerization include solution, emulsion, suspension, and bulk polymerization. While physical properties of the polymers can be effected by the polymerization method, the resultant polymers can provide the desired outcomes of the invention.

No limitation is placed on the surfactant used. Suitable nonionic surfactants include, but are not limited to, those of the Tergitol® series (Union Carbide), those of the Alcodet®, Rhodasurf®, and Antarox® series (Rhone-Poulenc Co.), those of the Brij® series (ICI Americas Inc.), those of the Surfynol® series (Air Products Co.), those of the Neodol® series (Shell Chemical Co.), and those of the DeSonic® and Varonic® series (Witco).

Not wishing to be bound by a particular theory, the inventors believe that the polymer-bound, aliphatic, nonionic surfactant provides excellent water and marker resistance, long-term storage stability, and other desirable properties because the aliphatic portion of the surfactant provides a flexible chain to the polymer that can entangle with the chains of other polymers to form a network film that immobilizes the pigment onto the surface of the printed substrate. Also, the aliphatic chain provides the polymer with hydrophobic character in the ink and prevents insolubilization of the polymer.

Furthermore, the inventors believe that by binding the aliphatic, nonionic surfactant to the polymer, independent movement of the surfactant and the polymer in the ink is prevented. Therefore, the negative effects that an unbound surfactant can provide to an ink jet ink, such as loss of edge acuity, intercolor bleed, Maragoni effects, and excessive substrate penetration, can be avoided. Lack of independent movement, on the other hand, would not eliminate the positive aspects provided by a surfactant, such as increased pigment wetting and decreased drying time. In addition, incorporation of the surfactant onto the polymer provides the necessary hydrophobicity to maintain the solubility, or dispersibility, of the polymer/pigment interaction species in the ink medium.

Almost any derivatizing agent may be used, except that the reaction between the agent and the surfactant must yield a product that can be incorporated into a polymer and, if required, can provide solubility properties to the polymer as a carboxylic acid salt. Examples of derivatizing agents include maleic anhydride, 2,3-dimethylmaleic anhydride, phenylmaleic anhydride, citraconic anhydride, and itaconic anhydride.

No limitation is placed on the other monomers. Such other monomers include ethylenically-unsaturated monomers selected from the group consisting of olefins, mono vinylidene aromatics, alpha beta ethylenically-unsaturated carboxylic acids and esters thereof, ethylenically-unsaturated dicarboxylic anhydrides, and mixtures thereof. Preferred monomers are styrene, acrylic acid, and butyl acrylate.

No stringent limitation is imposed on the physical properties of the polymers. Preferred polymers are those having an acid number in the range of from about 10 to 300, a weight average molecular weight in the range of from about 500 to 100,000, a softening point in the range of from about 25 to 150° C., and a glass transition temperature of less than 150° C. More preferred polymers are those having an acid number in the range of from about 40 to 220, a weight average molecular weight in the range of from about 1000 to 20,000, a softening point in the range of from about 25 to 90° C., and a glass transition temperature of less than 90° C.

Any suitable amount of the polymer can be used. The polymer is used preferably in an amount in the range of from about 0.1% to 10%, more preferably in the range of from about 2% to 5%.

The ink of the present invention is preferably adjusted to an alkaline pH so that the solubility of the polymer and the long-term stability of the ink can be improved. According to the present invention, the pH value of the ink is preferably within the range of 7 to 10. Examples of pH adjustors include organic amines such as monoethanolamine, diethanolamine, triethanolamine, aminomethyl propanol, and ammonia, and inorganic alkali agents such as sodium hydroxide, lithium hydroxide, and potassium hydroxide.

One unique aspect of the present invention is that the percentage of carboxylic acid-containing monomer in the polymer composition required to provide the polymer with solubility in water as a salt can be reduced or eliminated if a sufficient amount of the reaction product of the surfactant and the derivatizing agent is incorporated into the polymer.

Another unique aspect of the present invention is that the ink prepared with the polymer can be formulated without the addition of a surfactant but yet possess the positive properties of a polymer that contains a non-bound surfactant. More importantly, the negative attributes of having a non-bound surfactant in the ink formulation, in particular those problems resulting from a Maragoni effect or substrate penetration, can be avoided.

Other Components

Consistent with the requirements of this invention, as appreciated by those skilled in the art, other agents may be incorporated in the ink composition such as agents to prevent intercolor bleed, anticurl and anticockle agents, antiseptic agents, biocides, chelating agents, corrosion inhibitors, desizing agents, mildewproofing agents, penetration promoters, pH adjusters and maintainers, pigment dispersants, resins, surface tension modifiers, surfactants, and viscosity modifiers.

Inks

The inks and polymers of the present invention are particularly suited for use in ink jet printers in general, and DOD ink jet printers in particular. Inks suitable for use in DOD ink jet printers should have a surface tension in the range of from about 20 to 70 dyne/cm, more preferably, in the range of from about 35 to 50 dyne/cm. The viscosity of the inks should be no greater than 15 cP at 25° C., and preferably below 5 cP. The inks should be stable to long term storage and to changes in temperature and relative humidity. In addition, they should dry quickly on the substrate but should not bleed through the substrate. No limitation is placed on the order in which the components of the ink compositions are combined or the method in which they are combined.

Substrates

A particularly desirable feature of the invention ink jet ink formulation is that there is no limitation placed on the recording medium used in conjunction with the above printing methods. Any suitable substrate can be employed, including conventional cellulosic papers such as copying paper and bond paper, silica coated papers, glass, aluminum, rubber, vinyl, fabrics, textile products, plastics, polymeric films, inorganic substrates such as metals and woods, and the like. In a preferred embodiment, the recording medium is a porous or absorbent substrate, such as uncoated paper.

The present invention will now be described in more detail through the use of the following examples. The examples are presented for illustrative purposes only, and are not intended to restrict the scope of the invention.

EXAMPLE 1

Into a round bottom flask equipped with an overhead stirrer, nitrogen delivery system, thermocouple, condenser, and Dean Stark trap was placed 259 grams of Brij® 35 (ICI Americas Inc.). The temperature was increased to 50° C. and 22 grams of maleic anhydride (Aldrich Chemical Co., Inc.) was added. After one hour, the reaction product, a tan solid with an acid number of 46, was collected.

EXAMPLE 2

Preparation of a polymer was conducted in a lab-scale continuous stirred-tank reactor (CSTR), a 1-liter, agitated Parr vessel, which is kept under nitrogen pressure. The monomers, solvent, chain transfer agent, and initiator were pumped continuously into the reactor through a dip leg, which extended to near the bottom of the vessel. The reaction mixture of polymer, solvent, unreacted monomers, and decomposition products was removed through the lid of the Parr and passed through a back-pressure regulator into a heated solvent flash vessel from which the devolatilized resin was pumped into a collection container. Vapors were drawn off the top of the flash vessel, condensed, and collected.

The weight ratio of monomers in the feed was 50:30:10:10 styrene (Aldrich Chemical Co., Inc.):acrylic acid (Aldrich Chemical Co., Inc.):butyl acrylate (Aldrich Chemical Co., Inc.):polymerizable surfactant described in Example 1. Based Oil weight of monomers, the feed contained 3.0% di-tert-butyl peroxide (Aldrich Chemical Co., Inc.) as an initiator and 1.6% 1-dodecanethiol (Aldrich Chemical Co., Inc.) as a chain transfer agent. The reaction solvent was isopropanol (Aldrich Chemical Co., Inc.) at 20% by weight of the total feed (26.2% by weight of monomers). Feed rate was 8.0 g/min, which gave a residence time in the CSTR of about 111 minutes. Process temperature in the CSTR was 157 to 160° C. Process temperature in the solvent flash vessel (SFV) during the steady-state part of the run ranged from 180 to 193° C. Pressure in the SFV was atmospheric and the resin pump discharged the resin continuously.

The resulting polymer had a molecular weight of 10,000 daltons, a glass transition temperature of 71° C., an acid number of 190, and a ring and ball softening point of 121° C.

EXAMPLE 3

Synthesis Example 2 was repeated except that 5 parts of polymerizable surfactant described in Example 1 was used instead of 10 parts. The resulting polymer had a molecular weight of 10,000 daltons, a glass transition temperature of 84° C., an acid number of 199, and a ring and ball softening point of 129° C.

EXAMPLE 4

An ink jet composition was prepared by mixing 5 parts of BONJET Black CW-1 (Orient Corp. of America), 10 parts of ethylene glycol (Aldrich Chemical Co.), 10 parts of Liponic® EG-1 (Lipo Chemicals, Inc.), and 75 parts water. The pH of the ink was adjusted to 10 with ammonium hydroxide. The ink had a viscosity of 2.6 cP, and a surface tension of 71.6 dynes/cm. Filtration of the ink was accomplished using a membrane filter having a pore size of 0.45 μm (Acrodisc® CR PTFE, supplied by Gelman Sciences).

The ink jet composition of this example was placed in a Hewlett Packard 51645A ink jet printer cartridge and was printed on uncoated paper (Nashua Dataprint Dual-Purpose Xerographic Bond, Nashua Office Products) using a Hewlett Packard Deskjet® HP 855 Cse thermal ink jet printer. The ink dried within seconds upon impact on the paper and the resulting printed image possessed good print quality (optical density of 1.3 and good print acuity). No indication of poor jetting was observed.

Several minutes after drying, the printed image was evaluated for water fastness and accent marker resistance. Water fastness was tested in two ways. First, a 0.5 mL drop of water was allowed to run across a printed image held at a 45 degree angle. Some displacement of colorant was observed. Second, a 0.5 mL drop of water was placed on the printed image, allowed to stand for several seconds, and then was displaced by shearing with a finger. A significant amount of colorant was displaced. Accent marker resistance was tested by drawing over the printed image with a basic and an acidic accent marker. A slight amount of colorant was removed by each type of marker.

Printing reliability was tested by printing approximately 200–300 pages of text in succession. Storage stability was tested by printing the ink composition after storage in the jet printer cartridge at room temperature for one week. Reliability and stability of the ink composition was evaluated as good since an increase in the number of missing or misplaced dots was not observed.

EXAMPLE 5

An ink jet composition was prepared by mixing 2.5 parts of the polymer described in Example 2, 7.5 parts of BONJET Black CW-1 (Orient Corp. of America), 10 parts of polyethylene glycol 300 (Fluka Chemika), 10 parts of LIPONIC® EG-1 (Lipo, Chemicals Inc.), and 70 parts water. The pH of the ink was adjusted to 10 with ammonium hydroxide. The ink had a viscosity of 3.4 cP, and a surface tension of 46.7 dynes/cm. Filtration of the ink was accomplished using a membrane filter having a pore size of 0.45 μm (Acrodisc® CR PTFE, supplied by Gelman Sciences).

The ink jet composition of this example was placed in a Hewlett Packard 51645A ink jet printer cartridge and was printed on uncoated paper (Nashua Dataprint Dual-Purpose Xerographic Bond, Nashua Office Products) using a Hewlett Packard Deskjet® HP 855 Cse thermal ink jet printer. The ink dried within seconds upon impact on the paper and the resulting printed image possessed good print quality (optical density of 1.3 and good print acuity). No indication of poor jetting was observed.

Several minutes after drying, the printed image was evaluated for water fastness and accent marker resistance through an exercise similar to that of Example 4. The printed image from the ink jet composition of this example was completely accent marker resistant and was superior in water fastness to the image of Example 4.

Printing reliability was tested through an exercise similar to that of Example 4. Reliability and storage stability were good.

EXAMPLE 6

An ink jet composition was prepared by mixing 2.4 parts of the polymer described in Example 3, 0.1 parts of Brij® 35, 5 parts of BONJET Black CW-1 (Orient Corp. of America), 10 parts of polyethylene glycol 300 (Fluka Chemika), 10 parts of LIPONIC EG-1 (Lipo Chemicals Inc.), 1 part of ethanol (Fischer Scientific), and 69 parts water. The pH of the ink was adjusted to 8.0 with ammonium hydroxide. The ink had a viscosity of 3.5 cP, and a surface tension of 43.7 dynes/cm. Filtration of the ink was accomplished using a membrane filter having a pore size of 0.45 μm (Acrodisc® CR PTFE, supplied by Gelman Sciences).

The ink jet composition of this example was placed in a Hewlett Packard 51645A ink jet printer cartridge and was printed on uncoated paper (Nashua Dataprint Dual-Purpose Xerographic Bond, Nashua Office Products) using a Hewlett Packard Deskjet® HP 855 Cse thermal ink jet printer. The ink dried within seconds upon impact on the paper and the resulting printed image possessed poor print quality (optical density of 1.10 and poor print acuity). Poor jetting was observed.

Several minutes after drying, the printed image was evaluated for water fastness and accent marker resistance through an exercise similar to that of Example 4. The printed image from the ink jet composition of this example was poorer in accent marker resistant and water fastness with respect to the image of Example 4.

The subject matter of the invention disclosed herein is considered to be:

(1) An ink jet ink composition comprising a colorant, a carrier medium, and a polymer comprising a polymerizable half-ester of an aliphatic, nonionic surfactant, and a monomer;

(2) The composition of (1) wherein the colorant is a pigment selected from the group consisting of organic and inorganic water-insoluble colorants;

(3) The composition of (2) wherein the pigment is selected from the group consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, C.I. Vat Blue 6, and carbon black;

(4) The composition of (2) wherein the pigment is present in an amount from about 1% to about 20%, by weight of the total ink composition;

(5) The composition of (4) wherein the pigment is present in an amount from about 2% to about 5%, by weight of the total ink composition;

(6) The composition of (2) wherein the pigment has a particle size from about 0.1 to about 100 microns in diameter;

(7) The composition of (6) wherein the pigment has a particle size from about 0.01 to about 10 microns in diameter;

(8) The composition of (7) wherein the pigment has a particle size from about 0.01 to about 5 microns in diameter;

(9) The composition of (1) wherein the carrier medium is selected from the group consisting of water, a water-soluble organic compound, and combinations thereof;

(10) The composition of (9) wherein the water-soluble organic compound is selected from the group consisting of alcohols, amides, carboxylic acids, esters, ethers, glycerine, glycols, glycol esters, glycol ethers, ketones, lactams, lactones, organosulfides, derivatives thereof and mixtures thereof;

(11) The composition of (10) wherein the alcohols are selected from the group consisting of methyl alcohol, ethyl alcohol, n-propl alcohol, isopropyl alcohol, n-butyl alcohol, sec-butyl alcohol, and tert-butyl alcohol;

(12) The composition of (10) wherein the amides are selected from the group consisting of dimethylformamide and dimethylacetamide;

(13) The composition of (10) wherein the esters are selected from the group consisting of ethyl acetate, ethyl lactate, and ethylene carbonate;

(14) The composition of (10) wherein the ethers are selected from the group consisting of tetrahydrofuran and dioxane;

(15) The composition of (1) wherein the ketones are selected from the group consisting of acetone, diacetone, and methyl ethyl ketone;

(16) The composition of (10) wherein the lactams are selected from the group consisting of N-isopropyl caprolactam and N-ethyl valerolactam;

(17) The composition of (10) wherein the lactone is butyrolactone;

(18) The composition of (10) wherein the sulfone is dimethylsulfone;

(19) The composition of (10) wherein the organosulfoxides are selected from the group consisting of dimethyl sulfoxide and tetramethylene sulfoxide;

(20) The composition of (10) wherein the carrier media is comprised of alcohol and glycol;

(21) The composition of (20) wherein the alcohol is ethanol and the glycol is diethylene glycol;

(22) The composition of (1) wherein the surface tension is from about 20 to about 70 dynes/cm and the viscosity is below about 15 cP at 25° C.;

(23) The composition of (22) wherein the surface tension is from about 35 to about 50 dynes/cm;

(24) The composition of (22) wherein the viscosity is below about 5 cP at 25° C.;

(25) The composition of (1) wherein the polymer is prepared by polymerization wherein the monomer is polymerized with an esterification product of an aliphatic surfactant and a derivatizing agent;

(26) The composition of (25) wherein the surfactant is an aliphatic nonionic surfactant;

(27) The composition of (25) wherein the derivatizing agent is selected from the group consisting of maleic anhydride, 2,3-dimethylmaleic anhydride, phenylmaleic anhydride, citraconic anhydride, and itaconic anhydride;

(28) The composition of (25) wherein the monomer is an ethylenically-unsaturated monomer;

(29) The composition of (28) wherein the ethylenically-unsaturated monomer is selected from the group consisting of olefins, mono vinylidene aromatics, alpha beta ethylenically-unsaturated carboxylic acids and esters thereof, ethylenically-unsaturated dicarboxylic anhydrides, and mixtures thereof; and

(30) The composition of (28) wherein the ethylenically-unsaturated monomer is selected from the group consisting of styrene, acrylic acid, and butyl acrylate.

While the invention has been described above with reference to the specific embodiments thereof, it will be apparent to skilled persons that many changes, modifications, and variations may be made to the details of the invention described herein without departing from the underlying principles of the inventive concept disclosed.

What is claimed is:

1. An ink jet ink composition comprising a colorant, a carrier medium, and a polymer comprising a polymerizable half-ester of an aliphatic, nonionic surfactant and a monomer, wherein the composition exhibits an acid number from about 40 to about 220, a weight average molecular weight from about 1,000 to about 20,000, a softening point from about 25° C. to about 90° C., a glass transition temperature of less than about 90° C., a surface tension from about 20 to about 70 dynes/cm and a viscosity below about 15 cP at 25° C.

2. The composition of claim 1 wherein the colorant is a pigment selected from the group consisting of organic and inorganic water-insoluble colorants.

3. The composition of claim 2 wherein the pigment is selected from the group consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, C.I. Vat Blue 6, and carbon black.

4. The composition of claim 2 wherein the pigment is present in an amount from about 1% to about 20%, by weight of the total ink composition.

5. The composition of claim 4 wherein the pigment is present in an amount from about 2% to about 5%, by weight of the total ink composition.

6. The composition of claim 2 wherein the pigment has a particle size from about 0.1 to about 100 microns in diameter.

7. The composition of claim 6 wherein the pigment has a particle size from about 0.01 to about 10 microns in diameter.

8. The composition of claim 7 wherein the pigment has a particle size from about 0.01 to about 5 microns in diameter.

9. The composition of claim 1 wherein the carrier medium is selected from the group consisting of water, a water-soluble organic compound, and combinations thereof.

10. The composition of claim 9 wherein the water-soluble organic compound is selected from the group consisting of alcohols, amides, carboxylic acids, esters, ethers, glycerine, glycols, glycol esters, glycol ethers, ketones, lactams, lactones, organosulfides, sulfones, organosulfoxides, derivatives thereof and mixtures thereof.

11. The composition of claim 10 wherein the alcohols are selected from the group consisting of methyl alcohol, ethyl alcohol, n-propl alcohol, isopropyl alcohol, n-butyl alcohol, sec-butyl alcohol, and tert-butyl alcohol.

12. The composition of claim 10 wherein the amides are selected from the group consisting of dimethylformamide and dimethylacetamide.

13. The composition of claim 10 wherein the esters are selected from the group consisting of ethyl acetate, ethyl lactate, and ethylene carbonate.

14. The composition of claim 10 wherein the ethers are selected from the group consisting of tetrahydrofuran and dioxane.

15. The composition of claim 10 wherein the ketones are selected from the group consisting of acetone, diacetone, and methyl ethyl ketone.

16. The composition of claim 10 wherein the lactams are selected from the group consisting of N-isopropyl caprolactam and N-ethyl valerolactam.

17. The composition of claim 10 wherein the lactone is butyrolactone.

18. The composition of claim 10 wherein the sulfone is dimethylsulfone.

19. The composition of claim 10 wherein the organosulfoxides are selected from the group consisting of dimethyl sulfoxide and tetramethylene sulfoxide.

20. The composition of claim 10 wherein the carrier media is comprised of alcohol and glycol.

21. The composition of claim 20 wherein the alcohol is ethanol and the glycol is diethylene glycol.

22. The composition of claim 1 wherein the surface tension is from about 35 to about 50 dynes/cm.

23. The composition of claim 1 wherein the viscosity is below about 5 cP at 25° C.

24. The composition of claim 1 wherein the polymer is prepared by polymerization wherein the monomer is polymerized with a half-ester esterification product of an aliphatic, nonionic surfactant and a derivatizing agent.

25. The composition of claim 24 wherein the derivatizing agent is selected from the group consisting of maleic anhydride, 2,3-dimethylmaleic anhydride, phenylmaleic anhydride, citraconic anhydride, and itaconic anhydride.

26. The composition of claim 24 wherein the monomer is an ethylenically-unsaturated monomer.

27. The composition of claim 26 wherein the ethylenically-unsaturated monomer is selected from the group consisting of olefins, mono vinylidene aromatics, alpha beta ethylenically-unsaturated carboxylic acids and esters thereof, ethylenically-unsaturated dicarboxylic anhydrides, and mixtures thereof.

28. The composition of claim 26 wherein the ethylenically-unsaturated monomer is selected from the group consisting of styrene, acrylic acid, and butyl acrylate.

29. An ink composition comprising:

(a) from about 40% to about 98% of a water-based carrier medium, (b) from about 1% to about 20% of one or more pigments, and (c) from about 0.1 to about 10% of at least one polymer, soluble or dispersible in water or in alkali, said polymer comprising (i) at least 0.1% by weight based on the total weight of the polymer of a monomer represented by the formula

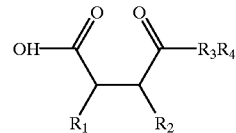

where
$R_1$ is H, $CH_3$, or $C_6H_5$,
$R_2$ is H, $CH_3$, or $C_6H_5$,
$R_3$ is O, N, or S, and
$R_4$ is of the formula

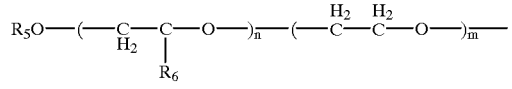

where
$R_5$ is $C_8$–$C_{20}$ alkyl or $C_8$–$C_{16}$ alkylphenyl,
each $R_6$ is $C_1$–$C_2$ alkyl, and
n is an average number from about 6–100 and m is an average number from about 0–50 provided that $n \geq m$ and $\Sigma(n+m)$ is about 6–100, and (ii) at least one ethylenically-unsaturated monomer selected from the group consisting of olefins, mono vinylidene aromatics, alpha beta ethylenically-unsaturated carboxylic acids and esters thereof, ethylenically-unsaturated dicarboxylic anhydrides, and mixtures thereof.

* * * * *